United States Patent
Choi et al.

(10) Patent No.: US 10,837,614 B2
(45) Date of Patent: Nov. 17, 2020

(54) LIGHTING DEVICE FOR VEHICLE

(71) Applicants: HYUNDAI MOTOR COMPANY, Seoul (KR); KIA MOTORS CORPORATION, Seoul (KR)

(72) Inventors: Tae-Young Choi, Gwacheon-si (KR); Sung-Cheul Jeong, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/700,277

(22) Filed: Dec. 2, 2019

(65) Prior Publication Data

US 2020/0240608 A1 Jul. 30, 2020

(30) Foreign Application Priority Data

Jan. 29, 2019 (KR) .......................... 10-2019-0011360

(51) Int. Cl.
*F21S 41/65* (2018.01)
*F21S 41/20* (2018.01)
*B60Q 3/60* (2017.01)

(52) U.S. Cl.
CPC ................ *F21S 41/65* (2018.01); *B60Q 3/60* (2017.02); *F21S 41/285* (2018.01)

(58) Field of Classification Search
CPC ..... B60Q 3/20; B60Q 3/60; B60Q 3/62; F21S 41/285
See application file for complete search history.

(56) References Cited

U.S. PATENT DOCUMENTS

| | | | | |
|---|---|---|---|---|
| 5,598,280 A | * | 1/1997 | Nishio | F21V 5/04 349/57 |
| 2016/0265733 A1 | * | 9/2016 | Bauer | G02B 3/0006 |
| 2018/0118101 A1 | * | 5/2018 | Salter | B60Q 3/62 |
| 2018/0231210 A1 | * | 8/2018 | Nakamura | F21S 43/14 |
| 2018/0320852 A1 | * | 11/2018 | Mandl | F21S 41/322 |
| 2019/0072252 A1 | * | 3/2019 | Moser | F21S 41/151 |

FOREIGN PATENT DOCUMENTS

| | | |
|---|---|---|
| KR | 20-2010-0005020 U | 5/2010 |
| KR | 10-2015-0007762 A | 1/2015 |

\* cited by examiner

*Primary Examiner* — William N Harris
(74) *Attorney, Agent, or Firm* — Morgan, Lewis & Bockius LLP

(57) ABSTRACT

A lighting device for a vehicle may include: a light source for generating light by an applied power source; and two or more films that allow light generated by the light source to be projected onto a particular shape depending on a pattern. Thermal expansion coefficients of at least two films among the two or more films are different from each other.

11 Claims, 9 Drawing Sheets

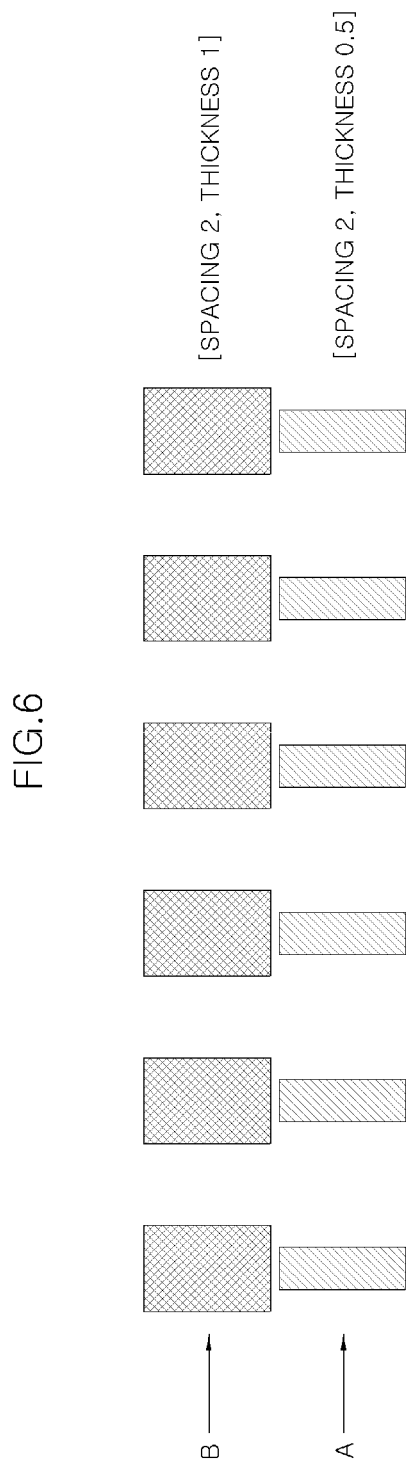

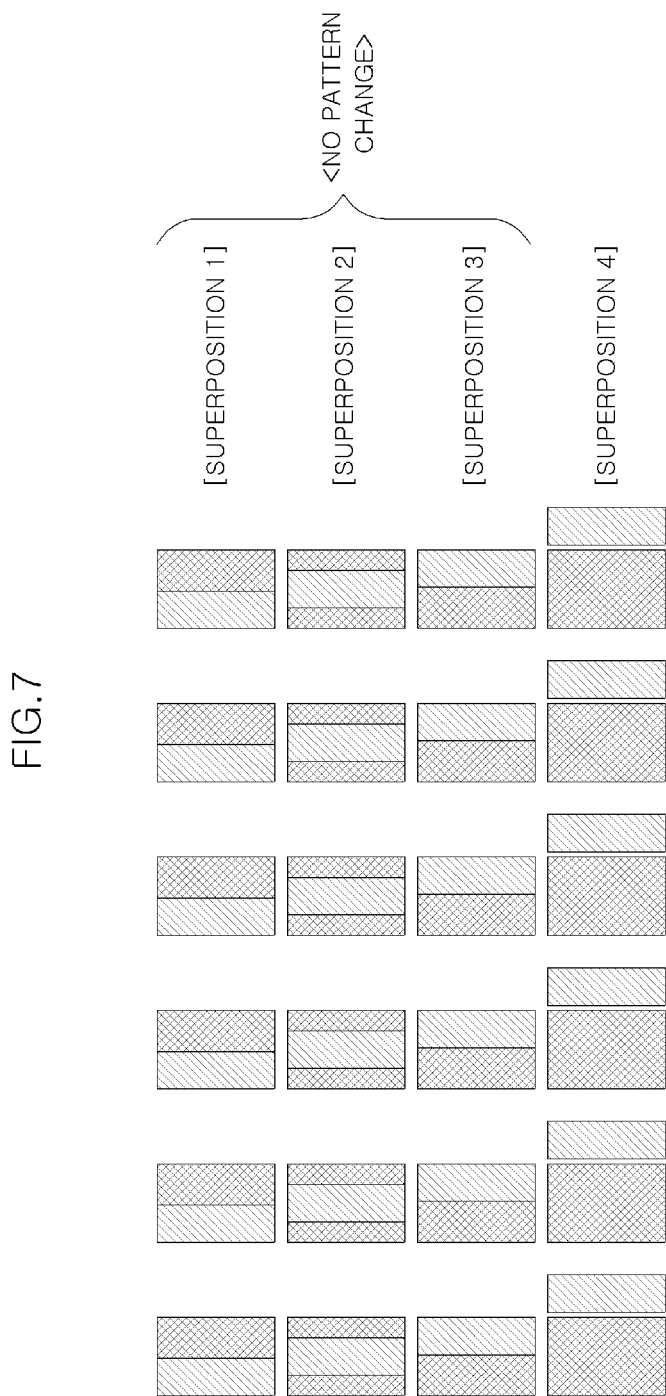

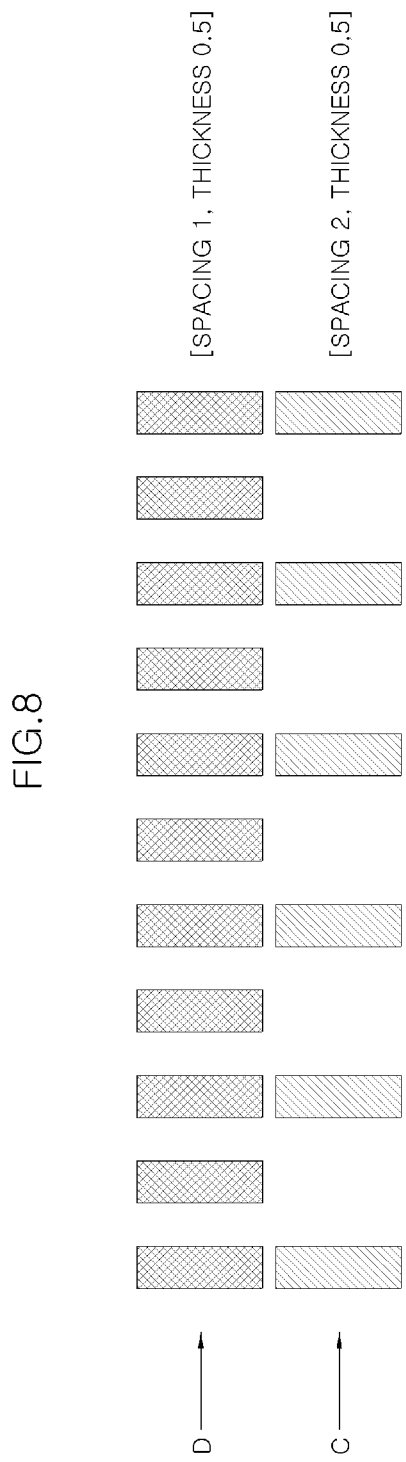

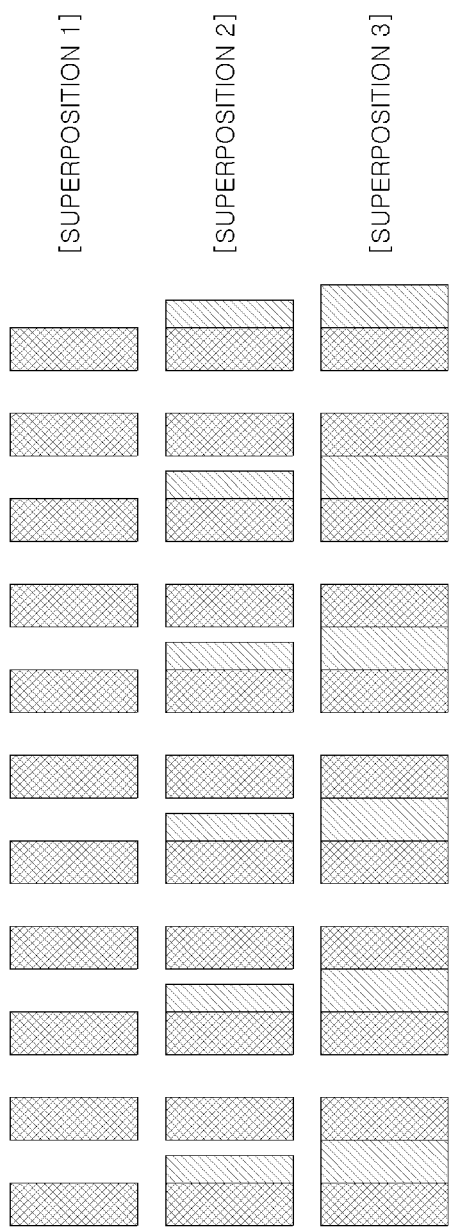

LIGHTING DEVICE FOR VEHICLE

CROSS-REFERENCE(S) TO RELATED APPLICATIONS

This application claims priority to Korean Patent Application No. 10-2019-0011360, filed on Jan. 29, 2019, which is incorporated herein by reference in its entirety.

TECHNICAL FIELD

The present disclosure relates to a lighting device, and more particularly, to a lighting device for an interior mood of a vehicle.

BACKGROUND

A vehicle is provided with lighting devices installed outside such as a headlight, a fog lamp, a backup light, a tail lamp, a position lamp, a license plate lamp, a braking lamp, a direction indicator lamp, and an emergency flasher lamp.

Inside the vehicle, there is also a mood lighting installed on the door side, head lining and center fascia, and so on.

In recent years, various design changes and aesthetic improvement of mood lighting have been demanded in accordance with the trend of emphasizing the beauty and usability of the vehicle.

However, the conventional mood lighting of the vehicle interior has a predetermined optical pattern or characters that are turned on/off or illuminated in various colors, but there are limitations on the dynamics of the mood lighting, which limits the merchantability of lighting and finished vehicles.

The above information disclosed in this Background section is only for enhancement of understanding of the background of the disclosure and therefore it may contain information that does not form the prior art that is already known in this country to a person of ordinary skill in the art.

SUMMARY OF THE INVENTION

The present disclosure is intended to solve the above mentioned problems and provide a lighting device for a vehicle that can be dynamically changed in a mood lighting applied to a vehicle interior and provided with various designs to improve the merchantability of lighting and finished vehicle.

A lighting device for a vehicle according to an exemplary embodiment of the present disclosure may include: a light source for generating light by an applied power source; and two or more films that allow light generated by the light source to be projected onto a particular shape depending on a pattern, wherein thermal expansion coefficients of at least two films among the two or more films are different from each other.

A difference between the thermal expansion coefficients of the at least two films may be equal to or greater than 0.001 cm/cm·° C.

Shapes of patterns on the two films may be different from each other.

An angle may be defined between respective directions in which shapes of patterns disposed on two films extend.

A distance between the centers of shapes formed on the patterns of one film of the two films and the distance between the centers of shapes formed on the patterns of the other film may be different from each other when the shapes of the patterns formed in the two films respectively are the same.

A bimetal coupled to one side of any one film among the two films may be further included.

A first bimetal coupled to one side of a first film of the two films and a second bimetal coupled to one side of a second film of the two films may be further included.

The first bimetal and the second bimetal may be coupled to one side of the first film and the second film, respectively, which do not overlap in a plane.

A lighting device for a vehicle according to another exemplary embodiment of the present disclosure may include: a light source for generating light by an applied power source; and two or more films that allow light generated by the light source to be projected onto a particular shape depending on a pattern; and a bimetal coupled to one side of any one film of the two or more films.

A lighting device for a vehicle according to yet another exemplary embodiment of the present disclosure may include: a light source for generating light by an applied power source; two or more films that allow light generated by the light source to be projected onto a particular shape depending on a pattern; a first bimetal coupled to one side of a first film of the two or more films; and a second bimetal coupled to one side of a second film of the two or more films.

The first bimetal and the second bimetal may be coupled to one side of the first film and the second film, respectively, which do not overlap in a plane.

In accordance with the lighting device for the vehicle according to an exemplary embodiments of the present disclosure, it can lead to various changes in design by changing the pattern displayed by the lighting depending on the temperature change of the vehicle interior.

This variation of the various patterns by the lighting device for the vehicle in the present disclosure does not require a separate drive device so that it cannot complicate the configuration and consume power.

Therefore, it is advantageous in terms of weight and cost compared to other devices for creating the same effect, and further enhances the merchantability of lighting device and finished vehicle.

BRIEF DESCRIPTION OF THE DRAWINGS

The above and other objects, features and advantages of the present disclosure will be more clearly understood from the following detailed description taken in conjunction with the accompanying drawings, in which:

FIG. 6 shows an example of two patterns depending on spacing and thickness;

FIG. 7 shows whether two patterns of FIG. 6 overlap or not;

FIG. 8 shows another example of two patterns depending on spacing and thickness;

FIG. 9 shows whether two patterns of FIG. 8 overlap or not;

DETAILED DESCRIPTION

In order to fully understand the benefits achieved by the performance of the present disclosure and the objectives achieved by exemplary embodiments of the present disclosure, reference should be made to the description in the accompanying drawing and attached drawing illustrating exemplary embodiments of the present disclosure.

In describing exemplary embodiments of the present disclosure, a description or repetitive description that would unnecessarily obscure the point of the present disclosure would reduce or omit the description.

Figure 1:
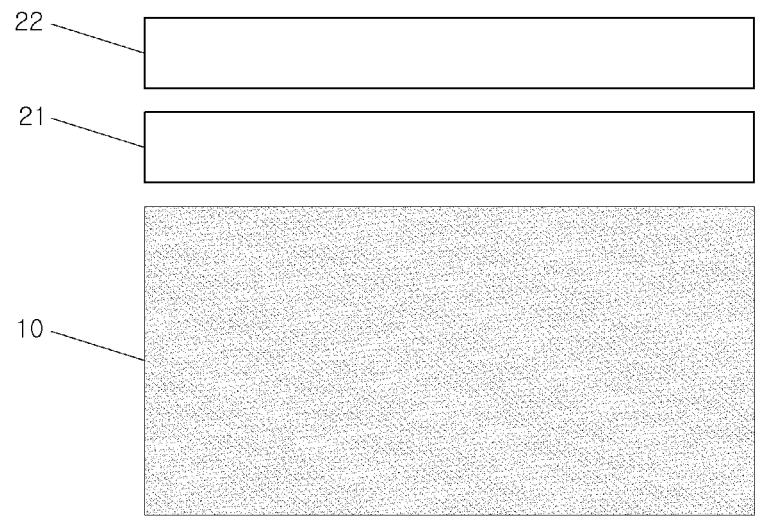
FIG. 1 is a schematic view of a side surface shape of a lighting device for a vehicle according to an exemplary embodiment of the present disclosure.
Figure 2:
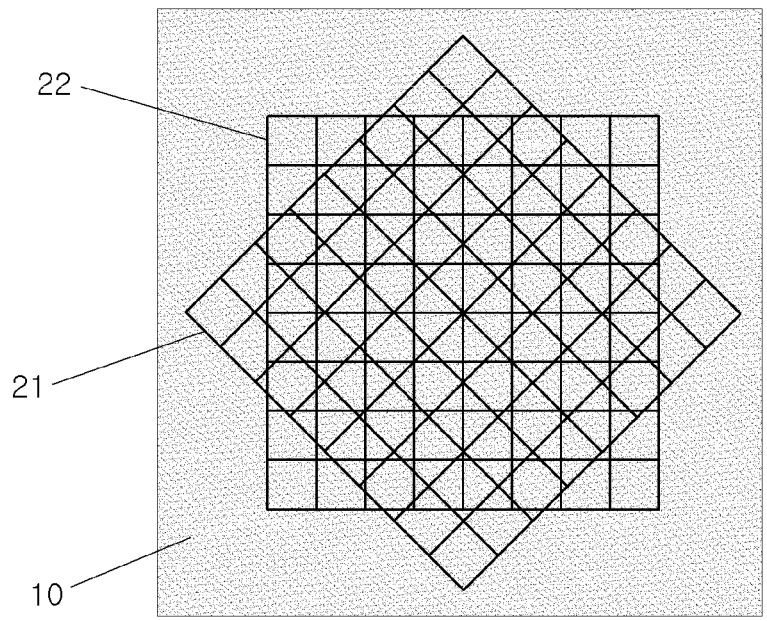
FIG. 2 is a schematic view of a plane shape of the lighting device for the vehicle according to an exemplary embodiment of the present disclosure.

FIG. 1 is a schematic view of a side surface shape of a lighting device for a vehicle according to an exemplary embodiment of the present disclosure, and FIG. 2 is a schematic view of a plane shape of the lighting device for the vehicle according to an exemplary embodiment of the present disclosure.

Hereinafter, referring to FIGS. 1 and 2, a lighting device for a vehicle according to an exemplary embodiment of the present disclosure will be described in detail.

A lighting device for a vehicle according to an exemplary embodiment of the present disclosure is a lighting device for mood lighting in a vehicle interior to dynamically change the pattern displayed by a light source.

The lighting device for the vehicle according to an exemplary embodiment of the present disclosure may include a light source 10 for generating light by an applied power source and two or more films 21 and 22 that allow light generated by the light source 10 to be projected onto a particular shape depending on the pattern.

Further, it can function as a dynamic mood lighting by a moire pattern generated by two or more films 21 and 22 with fine patterns formed without a separate driving device.

In the shown exemplary embodiment, the light source 10 is a planar light source, and two films 21 and 22 are exemplified on a planar light source.

The moire pattern means an interference pattern in the form of a wave pattern in which a period different from the original is visually produced depending on the difference in the period by overlapping or projecting a periodic lattice structure. Interference is a phenomenon that occurs when two or more waves meet each other according to the principle of superposition, and there are constructive interference and destructive interference. The constructive interference is an interference phenomenon where two waves having the same wavelength meet each other to be maximized in the amplitude and the intensity, and the destructive interference is an interference phenomenon where the two waves having the same wavelength meet with each other to be minimized in the amplitude and intensity.

In some conventional light devices using the moire pattern, there is a technique of generating the moire pattern by moving a patterned film by a separate driving device, but the present disclosure is a mood lighting device that can form the moire pattern without a separate driving device, based on the specificity of the vehicle.

Basically, the mood lighting of the vehicle interior is directed by points, lines or the surface light source 10 as shown, and implements functions such as On/Off, diming, and color change.

Further, two or more transparent films 21 and 22 having a fine pattern may be disposed on the light source 10. The fine pattern of both films 21 and 22 may be of the same type or of a different type.

When two or more films are consecutively disposed, a pattern is formed by overlapping two or more fine patterns, and the mood lighting having a specific pattern is realized by the light from the light source 10.

Thus, it is possible to implement a mood lighting device with a two dimensional pattern change and can be applied to the inner door side, a center fascia or a head lining of the vehicle.

Figure 3A:
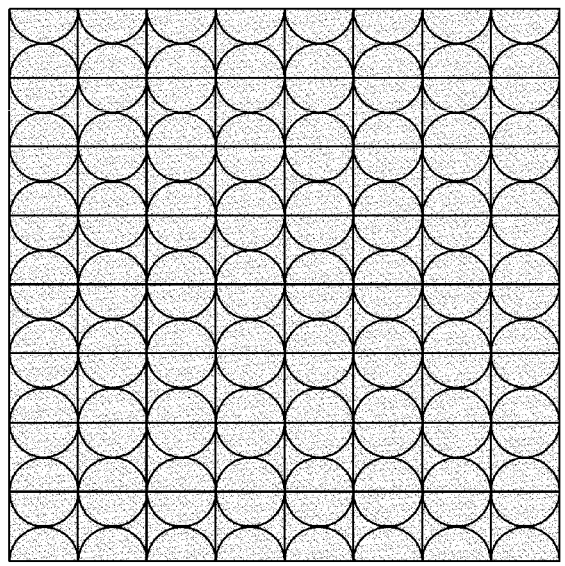
FIGS. 3A and 3B are examples of pattern changes by the lighting device for the vehicle of the present disclosure.
Figure 3B:
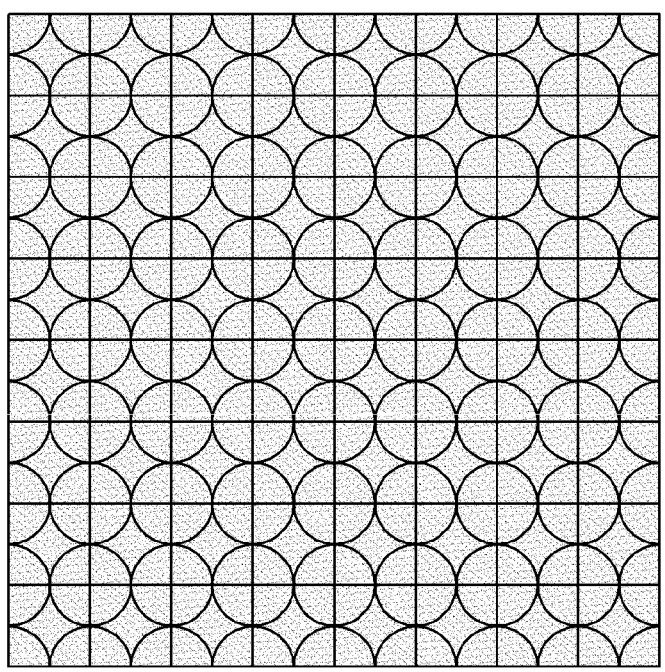

An example of a pattern formed by overlapping these two patterns is shown in FIG. 3A, and different patterns can be implemented depending on the angle or position where the pattern is superimposed. An example in which a pattern is relatively shifted to express another pattern is shown in FIG. 3B.

The present disclosure makes it possible to realize a variable pattern due to the moire phenomenon by causing relative displacement in a plurality of films without using a separate driving device.

That is, according to the outdoor temperature, the temperature of the vehicle interior is changed from below zero to about 70-80° C. or greatly changed by an air conditioner, and the present disclosure makes it possible to occur relative displacements between a plurality of films depending on the temperature change in the vehicle interior.

At least two films of two or more films in the present disclosure may be characterized by differing thermal expansion coefficients each other.

Therefore, when the temperature in the vehicle interior changes, as the expansion and contraction rates of each film with different thermal expansion coefficient are different, a moire image can be produced which is different from that before the temperature change.

When the thermal expansion coefficient of the first film 21 is $\alpha$ (cm/cm. ° C.), the thermal expansion coefficient of the second film 22 is $\beta$ (cm/cm. ° C.), and the length of one side of the two films 21 and 22 is 'a' (cm), if the temperature change of $\Delta K$ (° C.) occurs, the displacement difference $\Delta L$ of the film becomes a. $|\alpha-\beta|.\Delta K$.

Therefore, the temperature change inside the vehicle due to the use of air conditioning in the actual use environment of the vehicle except for the severe hot and cold environments occurs about 10° C. to 15° C. The larger the displacement difference of the two films, the larger the pattern change. Therefore, the difference in thermal expansion coefficient between the two films may be large, and the minimum $\Delta L$ for the aesthetic sensation by the moire pattern may be 0.01a or more in the experiment.

When the length 'a' of the film is 50 cm, an example of calculation of the displacement difference between films according to the thermal expansion coefficient and temperature change is summarized in Table 1.

TABLE 1

| thermal expansion coefficient difference ($\|\alpha - \beta\|$, cm/cm · ° C.) | Temperature change ($\Delta K$, ° C.) | Displacement difference between films ($\Delta L$, cm) |
| --- | --- | --- |
| 0.0001 | 10 | 0.05 |
| 0.001 | 10 | 0.5 |
| 0.0001 | 15 | 0.075 |
| 0.001 | 15 | 0.75 |

In other words, when the thermal expansion coefficient difference is the same, the larger the temperature change, the larger displacement difference between films becomes. On the basis of the minimum temperature change of 10° C., the difference of the thermal expansion coefficient $|\alpha-\beta|$ between the two films may be at least 0.001 in order that $\Delta L$ becomes 0.01a.

Therefore, the difference in thermal expansion coefficient between at least two of the two or more films having fine patterns constituting the present disclosure may be 0.001 cm/cm·° C. or more.

On the other hand, in the present disclosure, the displacement difference of the two films causes the image generated by overlapping the patterns to be changed. It is not preferable that it is composed of a pattern that the moire pattern is not expressed even if the displacement of the film occurs.

Figure 4A:
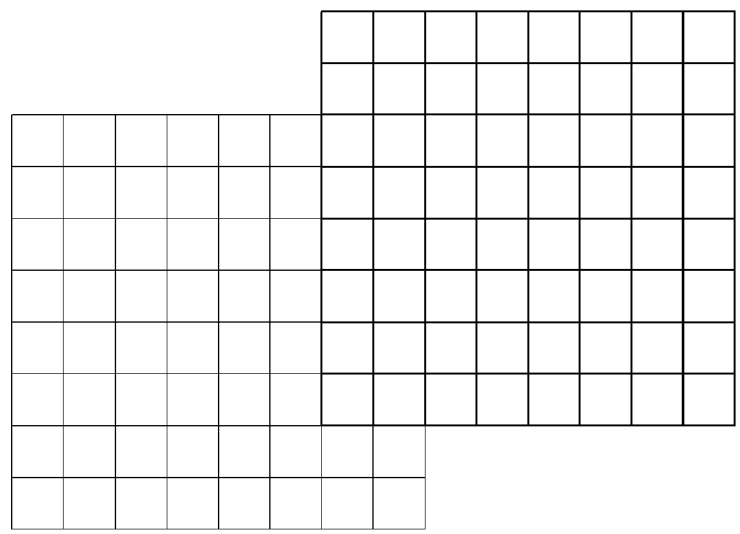
FIGS. 4A, 4B, 5A, and 5B indicate whether the patterns overlap or not when two patterns overlap.
Figure 4B:
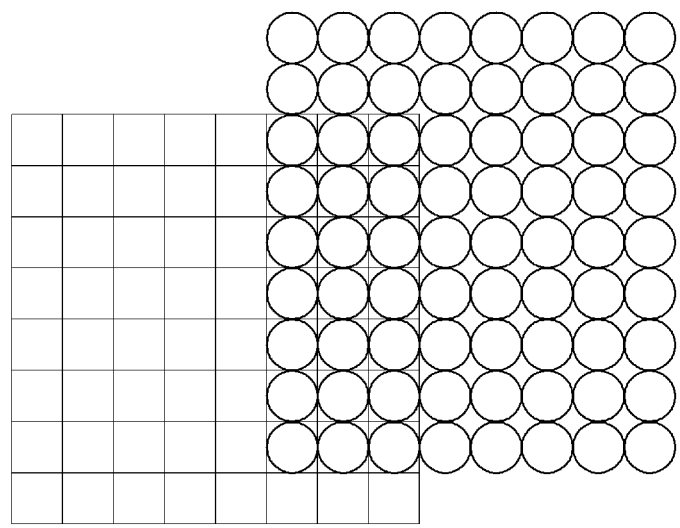

That is, as shown in FIG. 4A, there may be a superposition between the patterns of the same shape, so that the moire pattern may not be formed, and as shown in FIG. 4B, there may be no overlap between the patterns in different shape patterns, so that it is easy to form the moire pattern by the displacement difference.

Figure 5A:
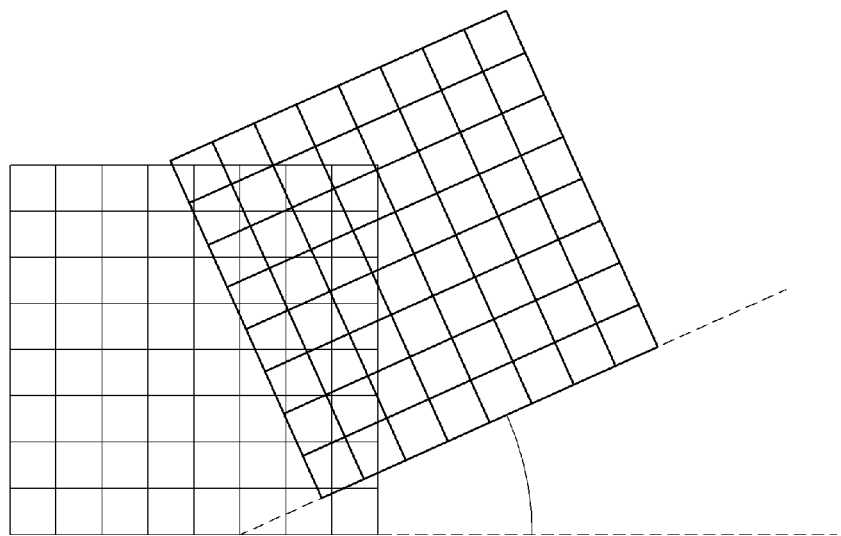
Figure 5B:
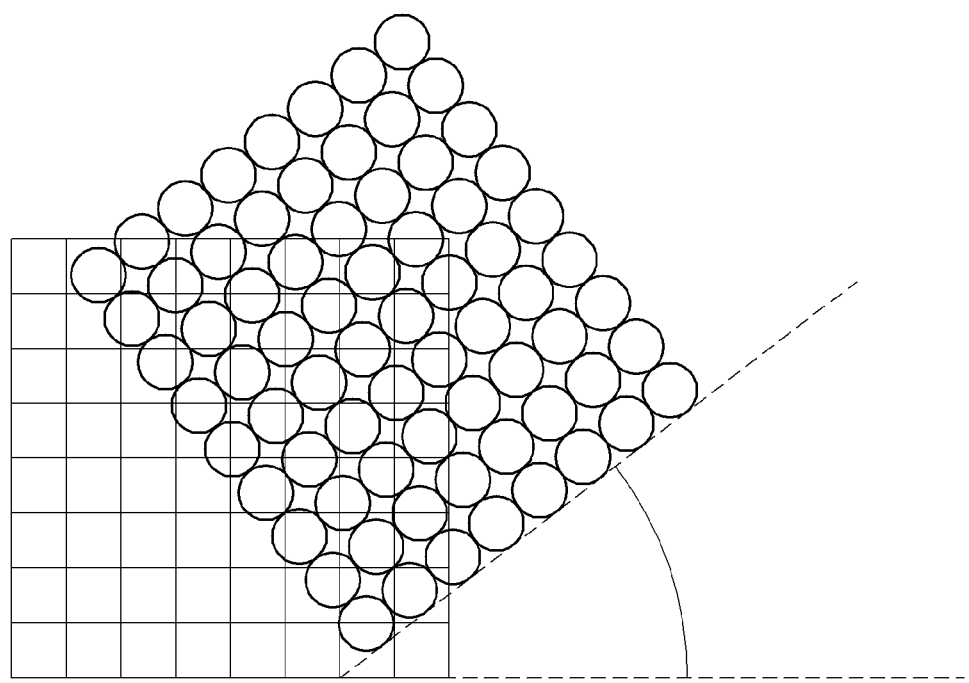

Further, as shown in FIGS. 5A and 5B, when the angles between the patterns are different, even if the shapes are the same or not the same, the patterns do not overlap.

Therefore, the fine patterns formed on two or more films of the present disclosure may have different shapes or different angles between the patterns.

However, the moire pattern formation is not impossible even if the shape of the pattern between two or more films is the same.

FIGS. 6 to 9 are drawings for explaining this and examples where the shapes of the pattern are same.

FIG. 6 shows a case where the pattern spacing is the same between the two patterns A and B, but the pattern thicknesses are different from each other.

In this case, as shown in FIG. 7, in the case of superposition 1, 2 and 3, since the same pattern should be formed, it is possible to form the moire pattern by generating a large displacement difference as in superposition 4.

On the other hand, FIG. 8 shows a case where two patterns C and D have the same pattern thickness but spacing pattern is different from each other.

In this case, as shown in FIG. 9, since the superposition 1, 2 and 3 all form different patterns, it is more advantageous in forming the moire pattern.

Therefore, in the present disclosure, the spacing between patterns of the first film and the spacing between patterns of the second film may be different from each other if the patterns formed on at least two films of two or more films are the same.

In the above, the same shape of the fine patterns formed on the film means that the shapes partitioned by the lines and repeatedly formed on the pattern are equal to each other, the thickness of the pattern means the thickness of the lines forming the pattern, and the spacing of the patterns means distance between the centers thereof in the shapes of the fine patterns.

Further, the angle between patterns means the angle formed by the directions of each pattern followed by the repeatedly formed shapes.

The present disclosure, as described above, can be used to form the moire pattern that can be varied by the difference in thermal expansion coefficient between a plurality of films and the differences in shape, angle and spacing of patterns formed on a plurality of films.

Figure 10:
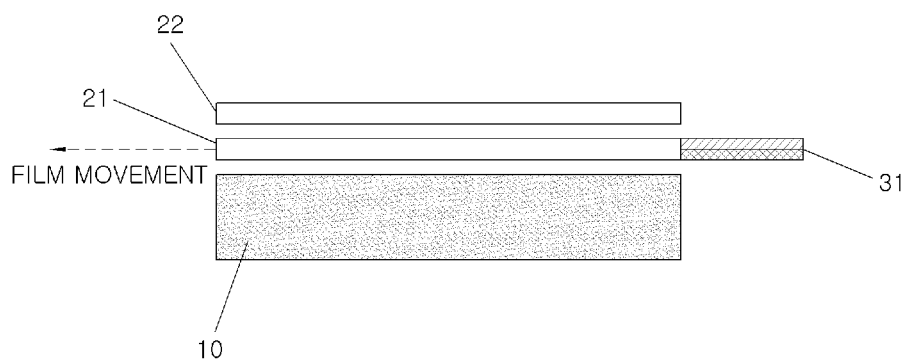
FIG. 10 is a schematic view of a side surface shape of a lighting device for a vehicle according to another exemplary embodiment of the present disclosure.
Figure 11:
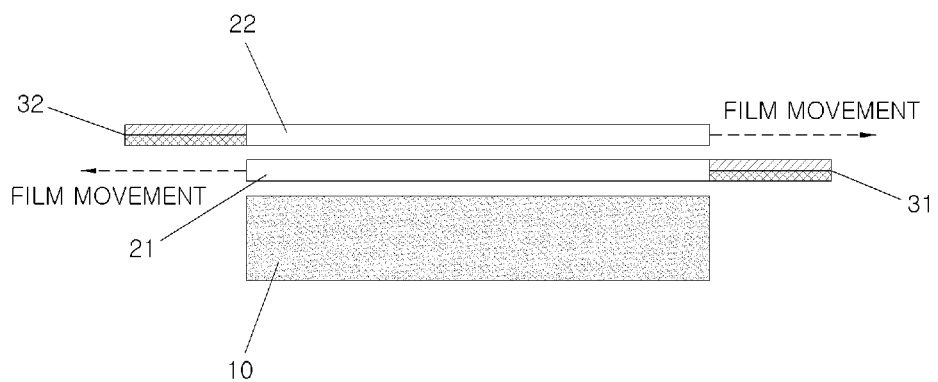
FIG. 11 is a schematic view of a side surface shape of a lighting device for a vehicle according to yet another exemplary embodiment of the present disclosure.

FIGS. 10 and 11 show a lighting device for a vehicle according to other exemplary embodiments of the present disclosures.

The lighting device for the vehicle according to the above exemplary embodiment of the present disclosure discloses that the difference in thermal expansion coefficient between two or more films deposited on the light source causes an automatic change of pattern upon temperature change, but the lighting device for the vehicle of FIG. 10 and FIG. 11 is intended to enlarge the displacement variation between a plurality of films of the above illustrative embodiment and the description of the configuration of the light source 10 and two or more films 21 and 22, the thermal expansion coefficient and the shape, angle and spacing of the pattern may be equally applied.

However, the lighting device for the vehicle according to other exemplary embodiments of FIG. 10 and FIG. 11, in order to further increase the displacement variation between a plurality of films, is characterized in that a first bimetal 31 is coupled to one side of the first film 21 as shown in FIG. 10, and is characterized in that the first bimetal 31 is bonded to one side of the first film 21 and a second bimetal 32 is bonded to one side of the second film 22.

Further, the second bimetal 32 may be coupled to one side of the second film 22 that does not overlap the first bimetal 31 on the plane so that the first film 21 and the second film 22 are moved in opposite directions to each other.

The bimetals 31 and 32 allow the new moire image to be implemented by moving the combined films 21 and 22 while bent when temperature changes.

When a bimetal is applied, the thermal expansion coefficients between a plurality of films may be the same or different from the reference of the preceding exemplary embodiment.

The bending displacement of the bimetal may be determined by the temperature change and the length and thickness of the bimetal.

Although the present disclosure has been described with reference to the drawings, it is to be understood that the present disclosure is not limited to the disclosed exemplary embodiments, and it will be apparent to those skilled in the art that various changes and modifications may be made without departing from the spirit and scope of the present disclosure. Accordingly, such modifications or exemplary variations should fall within the scope of the claims of the present disclosure, and the scope of the present disclosure should be construed on the basis of the appended claims.

What is claimed is:

1. A lighting device for a vehicle, comprising:
   a light source for generating light; and
   two or more films that allow light generated by the light source to be projected into a particular shape depending on a pattern provided on the two or more films,
   wherein thermal expansion coefficients of at least two films among the two or more films are different from each other.

2. The lighting device of claim 1, wherein a difference in the thermal expansion coefficients between the two films is equal to or greater than 0.001 cm/cm·° C.

3. The lighting device of claim 2, wherein shapes of patterns of the at least two films are different from each other.

4. The lighting device of claim 2, wherein an angle is defined between respective directions in which shapes of patterns disposed on two films extend.

5. The lighting device of claim 2, wherein a distance between centers of adjacent shapes of a pattern of one film among two films and a distance between centers of adjacent shapes of a pattern of another film among two films are different from each other when the patterns of the two films respectively have the same shapes.

6. The lighting device of claim 2, further comprising a bimetal coupled to one side of any one film among the two films.

7. The lighting device of claim 2, further comprising:
a first bimetal coupled to one side of a first film of the two films; and
a second bimetal coupled to one side of a second film of the two films.

8. The lighting device of claim 7, wherein the first bimetal and the second bimetal are coupled to one side of the first film and the second film, respectively, which do not overlap in a plane.

9. A lighting device for a vehicle, comprising:
a light source for generating light;
two or more films that allow light generated by the light source to be projected into a particular shape depending on a pattern provided on the two or more films; and
a bimetal coupled to one side of any one film of the two or more films.

10. A lighting device for a vehicle, comprising:
a light source for generating light;
two or more films that allow light generated by the light source to be projected into a particular shape depending on a pattern provided on the two or more films;
a first bimetal coupled to one side of a first film of the two or more films; and
a second bimetal coupled to one side of a second film of the two or more films.

11. The lighting device of claim 10, wherein the first bimetal and the second bimetal are coupled to one side of the first film and the second film, respectively, which do not overlap in a plane.

* * * * *